US011962697B2

(12) United States Patent
Paripally et al.

(10) Patent No.: US 11,962,697 B2
(45) Date of Patent: Apr. 16, 2024

(54) SYSTEMS AND METHODS FOR TRACKING CHAIN OF CUSTODY OF BODY WORN CAMERAS

(71) Applicant: Johnson Controls Tyco IP Holdings LLP, Milwaukee, WI (US)

(72) Inventors: Gopal Paripally, North Andover, MA (US); Jason M. Ouellette, Sterling, MA (US); Peter Lawrence, Lisburn (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 274 days.

(21) Appl. No.: 17/484,712

(22) Filed: Sep. 24, 2021

(65) Prior Publication Data
US 2023/0094544 A1 Mar. 30, 2023

(51) Int. Cl.
*H04L 9/32* (2006.01)
(52) U.S. Cl.
CPC ........................ *H04L 9/32* (2013.01)
(58) Field of Classification Search
CPC ................... H04L 9/32; G06F 21/64
See application file for complete search history.

(56) References Cited

U.S. PATENT DOCUMENTS

| 11,449,478 B2* | 9/2022 | Saurabh | H04L 9/3239 |
| 2019/0012249 A1* | 1/2019 | Mercuri | G06F 9/542 |
| 2020/0159891 A1* | 5/2020 | Patel | G06F 21/16 |

OTHER PUBLICATIONS

Kerr Michael et al: "A Blockchain Implementation for the Cataloguing of CCTV Video Evidence", 2018 15th IEEE International Conference On Advanced Video and Signal Based Surveillance (AVSS), IEEE, Nov. 27, 2018 (Nov. 27, 2018), pp. 1-6, XP033518260.*
International Search Report and Written Opinion in PCT/US2022/076699, dated Dec. 6, 2022, 17 pages.
Kerr et al., "A Blockchain Implementation for the Cataloguing of CCTV Video Evidence," 15th IEEE International Conference on Advanced Video and Signal Based Surveillance (AVSS), IEEE, Nov. 27, 2018, 6 pages.

* cited by examiner

*Primary Examiner* — Abiy Getachew
(74) *Attorney, Agent, or Firm* — ArentFox Schiff LLP

(57) ABSTRACT

Disclosed herein are apparatuses and methods for tracking chain of custody of a security camera using blockchain. An implementation may comprise receiving and granting a request for custody of a security camera by a first operator. The implementation further includes generating a block of a blockchain comprising identifiers of the first operator, security camera, and timestamp. The implementation includes distributing the blockchain to a plurality of nodes in a blockchain network. For each indication received of activity associated with usage and custody of the security camera to be recorded on the blockchain, the implementation includes generating a new block on the blockchain recording the activity. The implementation further includes receiving and verifying an authenticity a video clip from the security camera based on each activity recorded in the blockchain. In response to determining that the video clip is not authentic, the implementation includes generating an alert indicating inauthenticity.

20 Claims, 6 Drawing Sheets

100

110

120

SYSTEMS AND METHODS FOR TRACKING CHAIN OF CUSTODY OF BODY WORN CAMERAS

TECHNICAL FIELD

The described aspects relate to video authentication systems.

BACKGROUND

Aspects of the present disclosure relate generally to video authentication systems, and more particularly, to tracking chain of custody of body worn cameras.

Typical methods for preserving video evidence for forensics investigations often rely on an encryption and/or hashing algorithm to prevent tampering or to prove authenticity. However, this preservation is performed under the assumption that the video evidence is authentic in its initial state. If the video has already been tampered with before the encryption and/or hashing algorithms are applied, the video evidence will remain inauthentic. For example, if video footage is captured by a body worn camera of a law enforcement officer, and prior to uploading the video footage the body worn camera is stolen, there is no guarantee that the video footage was not tampered with (e.g., a criminal may have extracted the video footage from the camera memory, altered the video footage, and saved the altered video footage in the camera).

Thus, there exists a need to ensure that the video footage initially extracted from the body worn camera is authentic.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for tracking chain of custody of a security camera using blockchain, comprising receiving and granting a request for custody of a security camera by a first operator. The method further includes generating a block of a blockchain, wherein the block comprises an identifier of the first operator, an identifier of the security camera, and a request timestamp. The method further includes distributing the blockchain to a plurality of nodes in a blockchain network. For each indication received of activity associated with usage and custody of the security camera to be recorded on the blockchain, the method further includes verifying the activity and generating a new block on the blockchain recording the activity. The method further includes receiving a video clip from the security camera and verifying an authenticity of the video clip based on each activity recorded in the blockchain. In response to determining that the video clip is not authentic, the method further includes generating an alert indicating inauthenticity.

Another example implementation includes an apparatus for tracking chain of custody of a security camera using blockchain, comprising a memory and a processor communicatively coupled with the memory. The processor is configured to receive and grant a request for custody of a security camera by a first operator. The processor is configured to generate a block of a blockchain, wherein the block comprises an identifier of the first operator, an identifier of the security camera, and a request timestamp. The processor is configured to distribute the blockchain to a plurality of nodes in a blockchain network. For each indication received of activity associated with usage and custody of the security camera to be recorded on the blockchain, the processor is configured to verify the activity and generate a new block on the blockchain recording the activity. The processor is configured to receive a video clip from the security camera and verify an authenticity of the video clip based on each activity recorded in the blockchain. In response to determining that the video clip is not authentic, the processor is configured to generate an alert indicating inauthenticity.

Another example implementation includes an apparatus for tracking chain of custody of a security camera using blockchain, comprising means for receiving and granting a request for custody of a security camera by a first operator. The apparatus further includes means for generating a block of a blockchain, wherein the block comprises an identifier of the first operator, an identifier of the security camera, and a request timestamp. The apparatus further includes means for distributing the blockchain to a plurality of nodes in a blockchain network. The apparatus further includes means for, for each indication received of activity associated with usage and custody of the security camera to be recorded on the blockchain, verifying the activity and generating a new block on the blockchain recording the activity. The apparatus further includes means for receiving a video clip from the security camera and verifying an authenticity of the video clip based on each activity recorded in the blockchain. The apparatus further includes means for, in response to determining that the video clip is not authentic, generating an alert indicating inauthenticity.

Another example implementation includes a computer-readable medium for tracking chain of custody of a security camera using blockchain, executable by a processor to receive and grant a request for custody of a security camera by a first operator. The instructions are further executable to generate a block of a blockchain, wherein the block comprises an identifier of the first operator, an identifier of the security camera, and a request timestamp. The instructions are further executable to distribute the blockchain to a plurality of nodes in a blockchain network. The instructions are further executable to for each indication received of activity associated with usage and custody of the security camera to be recorded on the blockchain, verify the activity and generate a new block on the blockchain recording the activity. The instructions are further executable to receive a video clip from the security camera. The instructions are further executable to verify an authenticity of the video clip based on each activity recorded in the blockchain. The instructions are further executable to, in response to determining that the video clip is not authentic, generate an alert indicating inauthenticity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The terms camera, body worn camera, and security camera are used interchangeably in the present disclosure. As discussed previously, prior to extracting a video from a camera and preserving the video (e.g., on a blockchain), the authenticity of the video needs to be verified. The present disclosure provides this verification by tracking the chain of custody of the body worn camera. This may involve determining who used the body worn camera, where the body worn camera was located changes in users/ownership, and actions performed on the camera. This information may be stored on a blockchain in order to secure the chain of custody. If an unauthorized access of the body worn camera is performed or the camera is lost, the video evidence produced by the body worn camera can be further investigated.

Figure 1:
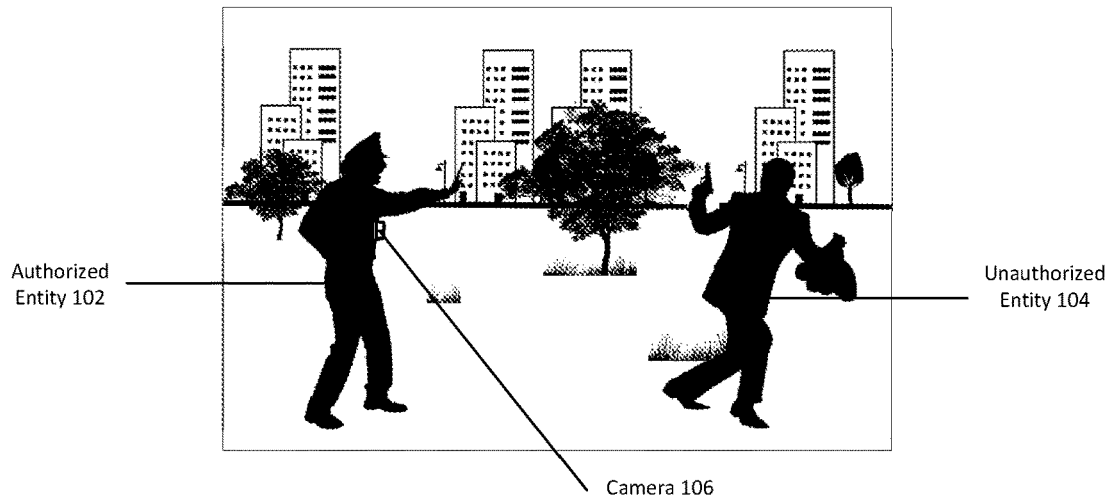
FIG. 1 is a diagram of various scenarios in which an authorized entity has or does not have possession of a body worn camera, in accordance with exemplary aspects of the present disclosure.
Figure 1:
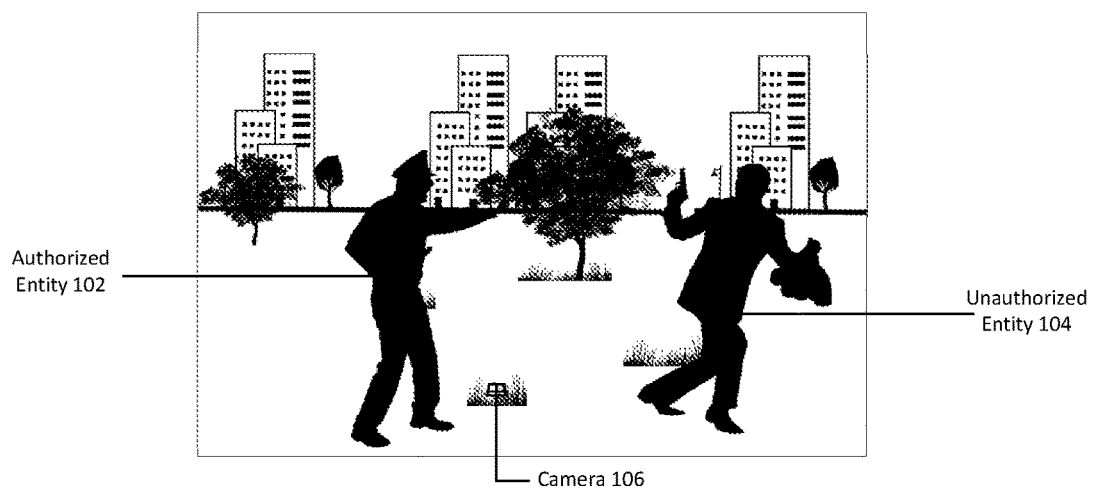
Figure 1:

FIG. 1 is a diagram of various scenarios 100, 110, and 120 in which an authorized entity 102 has or does not have possession of a body worn camera 106, in accordance with exemplary aspects of the present disclosure. In each scenario of FIG. 1, authorized entity 102 (e.g., a law enforcement officer) is attempting to stop unauthorized entity 104 (e.g., a criminal) from completing a crime. Authorized entity 102 may activate camera 106 to record entity 104 for video evidence and safety measures.

In scenario 100, camera 106 is in the custody of entity 102. Assuming that entity 102 is authorized to use camera 106, this scenario represents an ideal case where the video generated by camera 106 is not tampered with because camera 106 remains in the possession of entity 102.

In scenario 110, camera 106 has dropped to the ground or floor. Suppose that while in pursuit of the criminal, camera 106 falls off the uniform of the law enforcement officer. In this case, the video stored on camera 106 may be tampered with if camera 106 is not in the possession of entity 102 for more than a threshold period of time (e.g., someone may take camera 106 and access/delete any captured video).

In scenario 120, camera 106 is in the possession of entity 104. Suppose that the criminal picks up camera 106 from the ground in scenario 110 and attempts to flee so that video evidence is not usable. This represents the worst case scenario because the video can be tampered with. In some aspects, camera 106 may detect that another person is using camera 106 based on a biometric factor such as a fingerprint or a facial image captured by camera 106.

Figure 2:
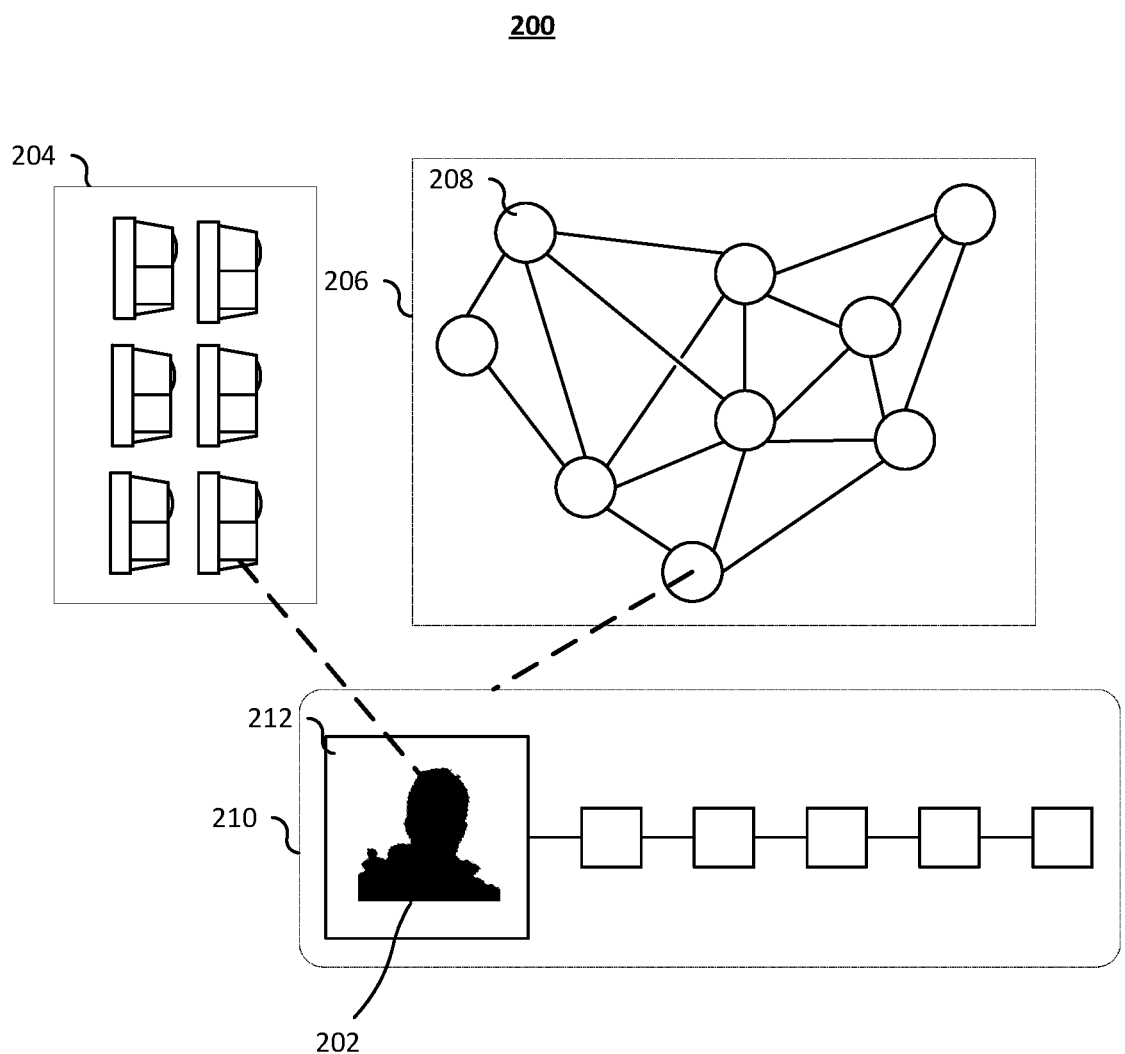
FIG. 2 is a diagram of a blockchain system used to track a chain of custody, in accordance with exemplary aspects of the present disclosure.

FIG. 2 is a diagram of blockchain system 200 used to track a chain of custody, in accordance with exemplary aspects of the present disclosure. System 200 includes blockchain network 206, which may comprise a plurality of nodes 208. In some aspects, each node 208 is a computing device (e.g., a computer, laptop, smartphone, server, etc.) that has access to blockchain 210. In some aspects, blockchain network 206 is a private network comprising nodes 208 that are added into network 206 by invitation. For example, blockchain network 206 may solely include nodes 208, which are computers of a law enforcement department.

In some aspects, blockchain network 206 is a public network in which nodes 208 can join without restrictions other than minimum hardware/software requirements for managing blockchain 210. For example, once a computer has installed the necessary dependencies to run the blockchain platform and has downloaded the latest blockchain 210, the computer may join network 206 as a node 208. In some aspects, blockchain 210 is provided by a blockchain-as-a-service (BaaS).

Consider an example in which a plurality of security cameras 204 are available for use by law enforcement officers. The plurality of security cameras 204 may be stored in a dock of a police station and may be fastened to the uniform of a law enforcement officer (hence referred to as a body worn camera). It should be noted that although body worn cameras and security cameras are discussed in the present disclosure, the systems and methods are applicable to any security device that can be checked out (e.g., a drone, a security vehicle, etc.). A law enforcement officer may request to be assigned one of security cameras 204 (e.g., at the dock, from a computing device such as his/her smartphone, a remote computer, etc.). The request may be received by a security system (i.e., the chain of custody component (CCC) described in FIG. 4) that tracks camera availability and chain of custody. When the request is made, CCC generates block 212 on blockchain 210 and records the request in the block. Details 202 such as time of request, source device identity (i.e., where the request came from), identity of the law enforcement officer, an identifier of the team/rank that the law enforcement officer belongs to, etc., may be stored as a part of the request. Nodes 208, which may be computers at the police station, may verify the request by determining whether the provided information is correct (e.g., did the request come from a law enforcement officer that is currently employed, is their ID correct, is the timestamp a working hour, etc.). In some aspects, the request may involve returning an assigned security camera 204, in which case nodes 208 may verify whether the security camera 204 was returned by the correct law enforcement officer.

In some aspects, in response to receiving a request, CCC may execute a smart contract on blockchain 210 to validate the law enforcement officer and gather details on available security cameras 204. If the law enforcement officer's details are valid, the assignment and/or return can be executed. The smart contract may issue a digital ID (e.g., an NFT) of the security camera 204 to the law enforcement officer for check-in/check-out. The check-in/check-out is also recorded on blockchain 210 by CCC. For checking-out, a "wallet" of the law enforcement officer communicates with the NFT from the smart contract to the dock, which indicates to the dock that the security camera 204 can be taken. All video recorded subsequent to checking-out is associated with the NFT and the law enforcement officer, while the law enforcement officer is in possession of the camera and up to checking-in the camera. For checking-in, the NFT is sent back to the dock, which marks the unit as available again. In general, custody of a camera is lasts from when a camera is activated and is assigned to a certain user until the camera is deactivated and/or assigned to a different user.

Figure 3:
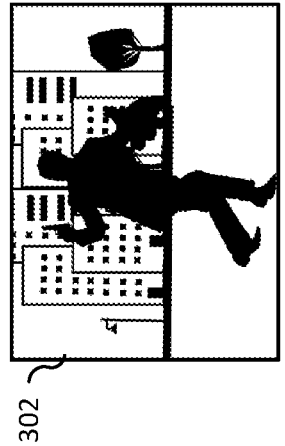
FIG. 3 is a diagram of a blockchain ledger used to verify chain of custody and actions performed on a body worn camera, in accordance with exemplary aspects of the present disclosure.

FIG. 3 is a diagram of blockchain ledger 300 (used interchangeably with distributed ledger 300 and blockchain 300) used to verify chain of custody and actions performed on a body worn camera, in accordance with exemplary aspects of the present disclosure. Blockchain 300 represents a chain of custody indicative of who "touched" security camera 204, when, how, and what was performed on security camera 204.

Each block in blockchain 300 is made up of a payload segment (e.g., 304, 310, 312, 314, 318), previous hash 306, and current hash 308. In some aspects, the initial hash value of the genesis block is a hash of the contents of payload segment 304. For example, the genesis block comprises information about a request for assignment. The information includes a name of the security camera requested for assignment, information about the camera (e.g., model, year, etc.), an identifier of the operator requesting the assignment (e.g., "Officer ABC"), a location of the camera (e.g., "NYC"), and a time when the request was received. The hash of this information is "1234ABCD5."

Suppose that the request is granted/denied. A subsequent block may indicate that the request was approved/denied, information indicated in payload 304, along with other information such as the time of approval/denial. In the case of a denial, the reason for the rejection may also be listed (e.g., incorrect officer ID). For simplicity, the block indicating a grant/denial is not shown.

In some aspects, when an operator is assigned a camera, he/she may establish a connection (e.g., NFC, Bluetooth, Wi-Fi, mobile data, etc.) between the camera and a computing device of the operator. The computing device may be, for example, a smartphone/smartwatch or personal digital assistant that belongs to a law enforcement officer. In some aspects, CCC may be installed as a blockchain client on the computing device of the operator. Thus, when an action is performed on the camera while it is in possession of the operator, the action is registered on blockchain 300 by CCC on the computing device. In some aspects, CCC may be installed directly on the security camera such that blockchain records may be generated and recorded directly from the security camera.

The subsequent block shows a transaction type of "record." For example, the camera may be used to record a scene (e.g., generate video clip 302). In addition to the information listed in payload 310, the block may include video metadata such as name, extension, size, creation time, frame information, length, etc., of the video and how the video recording was initiated (e.g., automatically because of a chase, or manually). Other actions that may be recorded on blockchain 300 may include accessing a preview of a generated video clip, deleting a clip, modifying a clip, changing a camera setting, etc.

In terms of how video recording was initiated, the following conditions may trigger the recording function of a camera: an accelerator (e.g., record if the user begins to run or achieves a certain speed, stop recording when the user stops), a shock/vibration sensor (e.g., record if the user is hit with a force that generates a shock/vibration), an audio sensor (e.g., record if the user provides a verbal command to record, record if a gunshot sound or scream are detected, etc.), a biometrics sensor (e.g., record if the pulse or heart rate of the user reaches a certain pre-determined level), a behavior/emotions engine (e.g., record if a certain combination of biometrics, sounds, acceleration, etc., signifying anger is achieved).

In some aspects, a location and possession check may periodically be initiated by CCC (either installed on the computing device connected to the security camera or installed on the security camera itself). The transactions may thus be used to assure that the security camera is not lost and is with the operator that the camera is assigned to.

Suppose that in a chase down, the security camera is dropped (e.g., scenario 110). In some aspects, a method for verifying whether a camera is in the possession of the operator is by determining whether the security camera has an established connection with a computing device (e.g., smartphone, smart watch, etc.) of the operator. For example, officer ABC may connect the security camera to his/her smartphone via a Bluetooth, NFC, or Wi-Fi connection. If the camera is dropped and the officer gets out of range from the computing device, the connection may be severed and a transaction type of "out of range" may be recorded on blockchain 300. This transaction type may indicate the last known coordinates of the camera and the time when the connection was lost.

In some aspects, if custody of a camera is lost, a camera may be configured to perform one or more of: upload all video to a central database within a threshold period of time (if a hardware issue such as low battery or poor Internet connection does not enable this, the upload may be cancelled), clear its memory drive, and encrypt all captured videos. In some aspects, these aspects are performed based on the time length since custody was lost. For example, if a security camera is lost for 30 minutes, the camera may encrypt its contents and attempt an upload. If the security camera is lost for 1 hour or is about to lose battery in less than a threshold amount of time, the security camera may alternatively or in addition wipe its memory. In some aspects, the camera may use "PowerG" technology for low-power data transmissions.

Payload 314 indicates that the recorded video is automatically deleted from the memory of the security camera. The transaction type "video self-deletion" may be used as a security mechanism to prevent an unauthorized entity from accessing the video clip. For example, the security camera may be configured to delete its contents if it has been out of range for more than one hour.

Payload 318 is one of many examples where CCC is able to detect malicious behavior. Suppose that the security camera captured video of a criminal robbing a bank and running away. If the security camera is lost (e.g., stolen by the criminal) and then reappears near the police station a few days later, it is possible that it may include a tampered video. Based on common logic, this tampered video should be identified as tampered or fake because the original video was deleted in the previous block. The transaction type "upload video" may involve uploading the contents of a video to a storage of the law enforcement office. When verifying the block, nodes 208 may determine that the video is fake because the size is inconsistent, because the camera was lost, and/or because the camera initiated video self-deletion. Accordingly, by tracking the chain of custody, fake videos can be identified and will not be used as original video evidence.

Figure 4:
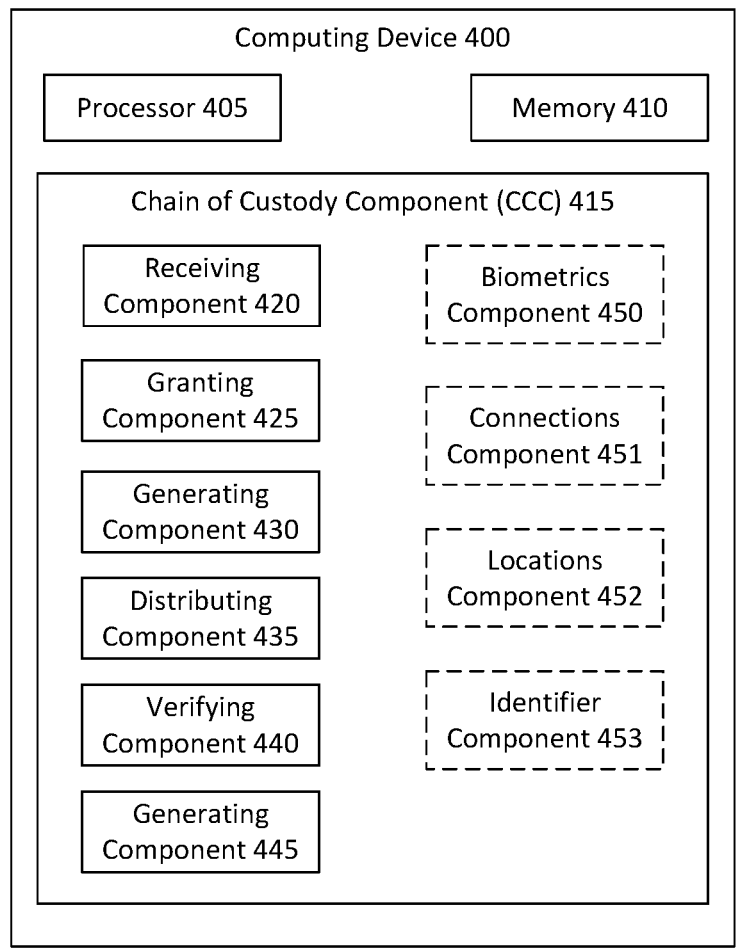
FIG. 4 is a block diagram of a computing device executing a chain of custody component (CCC), in accordance with exemplary aspects of the present disclosure.
Figure 5:
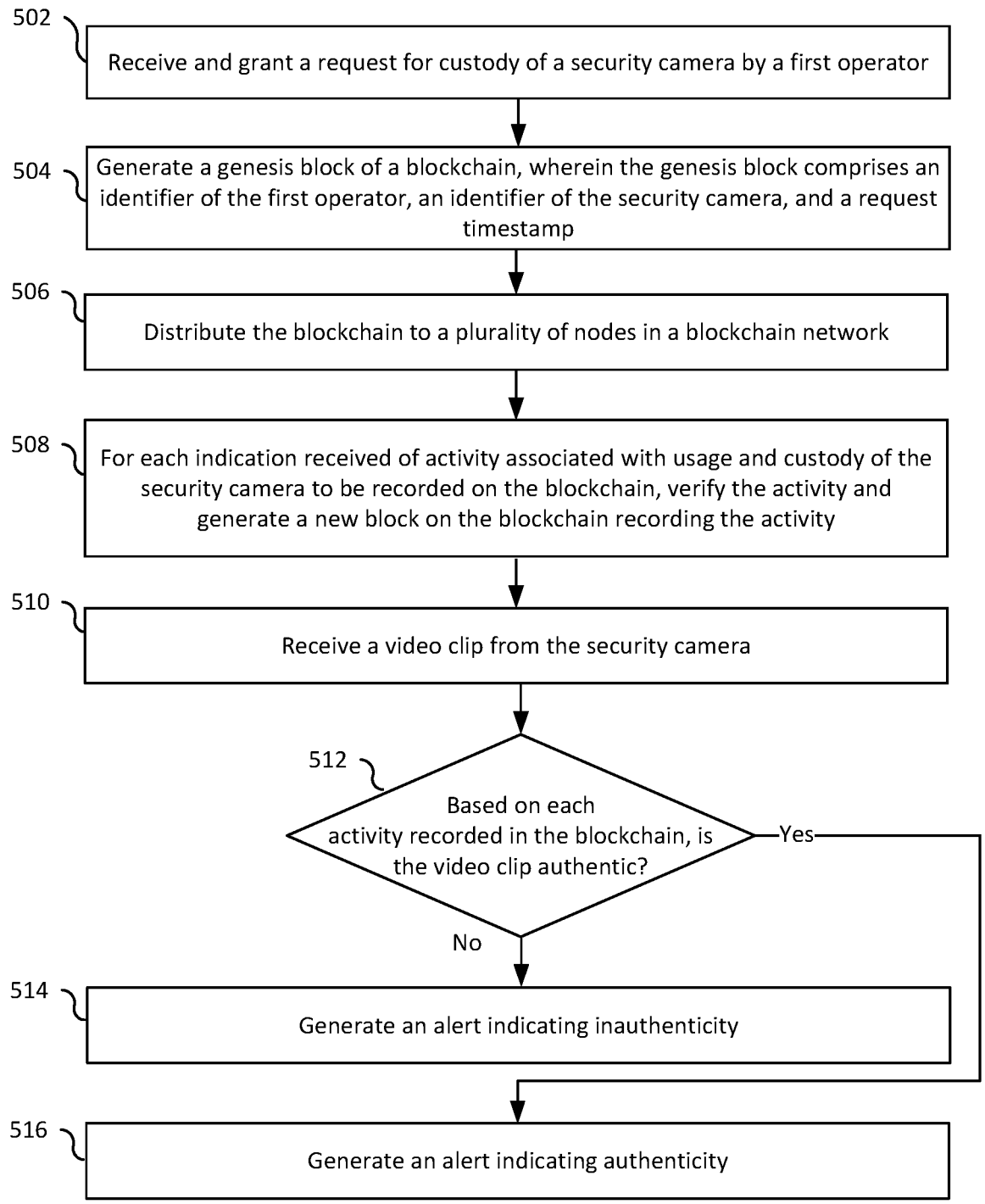
FIG. 5 is a flowchart illustrating a method of tracking chain of custody of a security camera using blockchain, in accordance with exemplary aspects of the present disclosure.

FIG. 4 is a block diagram of computing device 400 executing CCC 415, in accordance with exemplary aspects of the present disclosure. FIG. 5 is a flowchart illustrating method 500 of tracking chain of custody of a security camera using blockchain, in accordance with exemplary aspects of the present disclosure. Referring to FIG. 4 and FIG. 5, in operation, computing device 400 may perform method 500 of tracking chain of custody of a security camera using blockchain via execution of CCC 415 by processor 405 and/or memory 410.

At block 502, the method 500 includes receiving and granting a request for custody of a security camera by a first operator. For example, in an aspect, computer device 400, processor 405, memory 410, CCC 415, and/or receiving component 420 and granting component 425 may be configured to or may comprise means for receiving and granting a request for custody of security camera 106 by authorized entity 102. In some aspects, granting component 425 may execute a smart contract. Granting component 425 may verify, using the smart contract, that the first operator can take custody of the security camera (e.g., based on the credentials of the first operator) and issue to the first operator, using the smart contract, a non-fungible token (NFT) comprising the identifier of the security camera (e.g., a MAC address). Here, possession of the NFT is indicative of custody and the possession is monitored on the blockchain (i.e., whenever the NFT is transferred between operators, the transaction is recorded on the blockchain).

At block 504, the method 500 includes generating a genesis block of a blockchain, wherein the genesis block comprises an identifier of the first operator, an identifier of the security camera, and a request timestamp. For example, in an aspect, computer device 400, processor 405, memory 410, CCC 415, and/or generating component 430 may be configured to or may comprise means for generating a genesis block comprising payload 304, previous hash 306, and current hash 308 of blockchain 300. Payload 304 includes an identifier of authorized entity 102 (e.g., "Office ABC"), an identifier of the security camera 106 (e.g., "CameraXYZ", "XTS 11"), and a request timestamp (e.g., "Oct. 11, 2020, 2:23:40 PM").

At block 506, the method 500 includes distributing the blockchain to a plurality of nodes in a blockchain network. For example, in an aspect, computer device 400, processor 405, memory 410, CCC 415, and/or distributing component 435 may be configured to or may comprise means for distributing blockchain 300 to a plurality of nodes 208 in blockchain network 206. In some aspects, blockchain network 206 is a private blockchain network. For example, the members of the private blockchain network may solely be members of a law enforcement office.

At block 508, the method 500 includes, for each indication received of activity associated with usage and custody of the security camera to be recorded on the blockchain, verifying the activity and generating a new block on the blockchain recording the activity. For example, in an aspect, computer device 400, processor 405, memory 410, CCC 415, and/or verifying component 440 and generating component 430 may be configured to or may comprise means for receiving an indication of activity involving how a security camera is used and its current custody information. In some aspects, the activity comprises one of many transaction types such as recording, viewing, sharing, modifying, or deleting an image and/or video. The activity may also include the camera leaving a location, exiting a range, performing a video upload/download to/from a central database, connecting/disconnecting with a computing device of a first operator, etc. For each indication, verifying component 440 may determine whether the activity is authentic.

For example, when the indication is received, each node 208 of blockchain network 206 verifies the modification using its verifying component 440. Suppose that the activity involves recording a video. Verifying components in each node may confirm whether the person recording the video is in custody of the camera being used to record. For example, if Officer ABC has custody of CameraXYZ and the recording function is accessed by someone else, there has been a breach in the chain of custody. Each verifying component may generate a verdict on whether the transaction is valid or invalid (e.g., by verifying whether the stored biometrics of Officer ABC match the biometrics received at the time of recording). A consensus algorithm (e.g., byzantine fault tolerance (BFT)) is then utilized to determine whether to add the block to blockchain 300. For example, in blockchain 300, it may be determined that the recording function has been performed by Officer ABC because a majority if not all nodes agree that Officer ABC's biometrics match with the biometrics captured by the camera at the time of recording. Accordingly, generating component 430 may generate a new block with payload 310, a hash of the previous block, and a hash of the current payload 310 and/or previous hash.

In some aspects, multiple security cameras and activity associated with the multiple security cameras are stored on the same blockchain. In other aspects, the blockchain (e.g., blockchain 300) is a part of a plurality of blockchains, wherein each respective blockchain holds records of a different security camera (e.g., from cameras 204).

At block 510, the method 500 includes receiving a video clip from the security camera. For example, in an aspect, computer device 400, processor 405, memory 410, CCC 415, and/or receiving component 420 may be configured to or may comprise means for receiving a video clip (e.g., video.mp4) from the security camera (e.g., Camera XYZ) as shown in FIG. 3.

At block 512, the method 500 includes determining, based on each activity recorded in the blockchain, whether the video clip is authentic. For example, in an aspect, computer device 400, processor 405, memory 410, CCC 415, and/or verifying component 440 may be configured to or may comprise means for determining, based on each block in blockchain 300 (or at least the previous block), whether the video clip is authentic. In FIG. 3, payload 318 comprises activity that is not consistent with the remaining blocks of blockchain 300. In payload 314, it is agreed by network 206 that the video on CameraXYZ has been deleted. Accordingly, video.mp4 should not even exist. This discrepancy may be detected by each node in the network and the received video clip may be identified as inauthentic. Method 600 includes additional checks that the nodes may make during the verification.

In response to determining that the video clip is authentic, method 500 advances to 516. Otherwise, method 500 advances to 514.

At block 514, the method 500 includes generating an alert indicating inauthenticity. For example, in an aspect, computer device 400, processor 405, memory 410, CCC 415, and/or generating component 445 may be configured to or may comprise means for generating an alert (e.g., a textual or visual output) indicating inauthenticity. For example, the alert may state "the input video is inauthentic." In some aspects, generating component 445 may generate the alert on a user interface on computing device 400. In other aspects, generating component 445 may generate the alert as a text message, a web page, an email, etc., to a computing device of the authorized entity 102 or the law enforcement office.

At block 516, the method 500 includes generating an alert indicating authenticity. For example, in an aspect, computer device 400, processor 405, memory 410, CCC 415, and/or generating component 445 may be configured to or may comprise means for generating an alert indicating authenticity.

Figure 6:
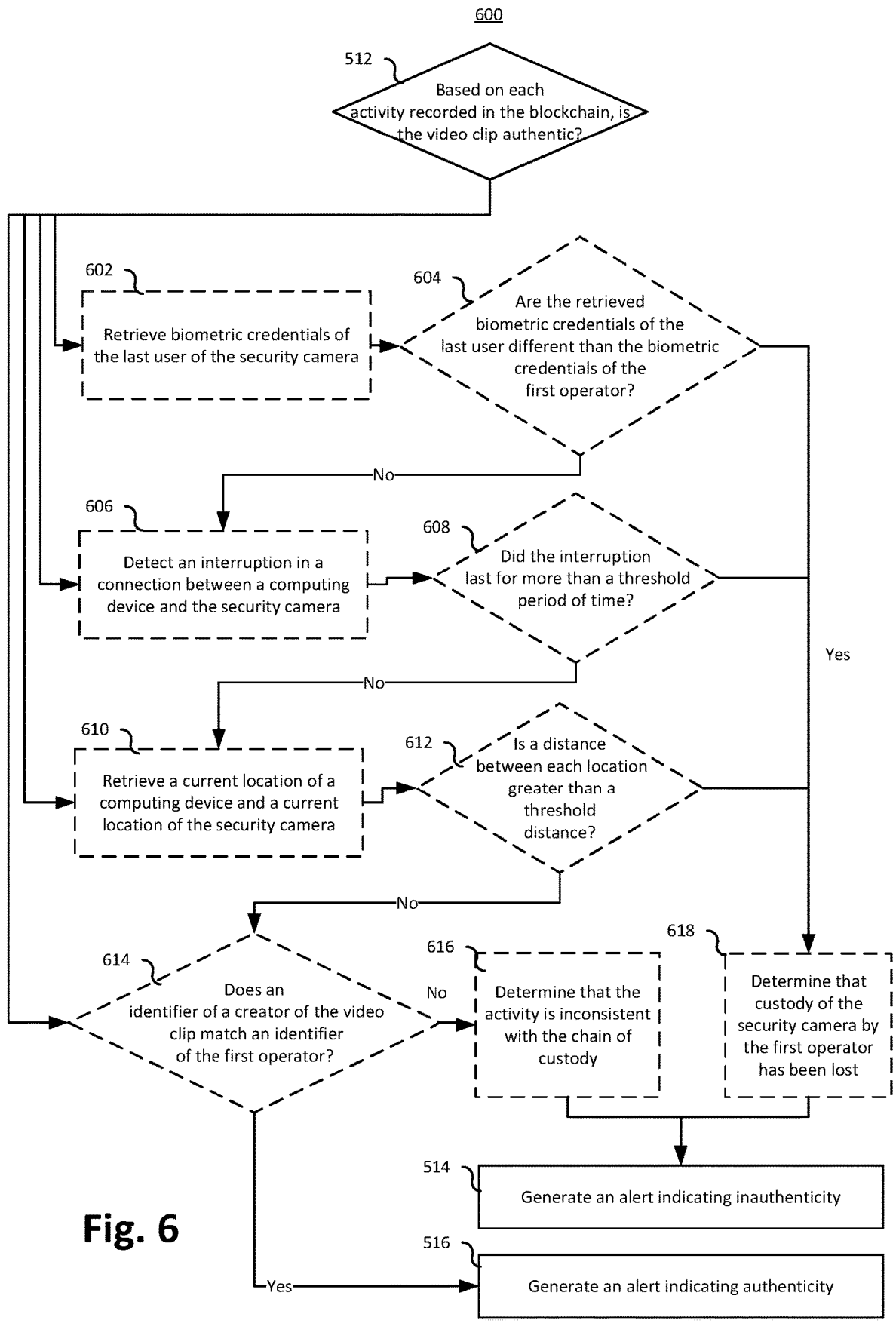
FIG. 6 is a flowchart illustrating a method of verifying the authenticity of a video clip, in accordance with exemplary aspects of the present disclosure.

FIG. 6 is a flowchart illustrating method 600 of verifying the authenticity of a video clip, in accordance with exemplary aspects of the present disclosure. Method 600 may be executed by CCC 415 during block 512 of method 500. Method 600 may start at any of blocks 602, 606, 610, and 614.

At block 602, the method 600 includes retrieving biometric credentials of the last user of the security camera. For example, in an aspect, computer device 400, processor 405, memory 410, CCC 415, and/or biometrics component 450 may be configured to or may comprise means for includes retrieving biometric credentials of the last user of camera 106. In some aspects, the biometric credentials include a face identifier (e.g., image of the user), an iris identifier (e.g., image of an eye of the user), a palm identifier (e.g., a palm print of the user), a voice identifier (e.g., a voice clip of the user), or a fingerprint identifier (e.g., a fingerprint of the user).

At block 604, the method 600 includes determining whether the retrieved biometric credentials of the last user are different than the biometric credentials of the first operator. For example, in an aspect, computer device 400, processor 405, memory 410, CCC 415, and/or biometrics component 450 may be configured to or may comprise means for determining whether the retrieved biometric credentials of the last user are different than the biometric credentials of the first operator. Biometrics component 450 may retrieve from memory 410 of computing device 400 or any other computing device 400 in network 206, stored biometric credentials of the first operator (e.g., a headshot of authorized entity 102, a fingerprint of authorized entity 102, etc.). Biometrics component 450 may then compare the respective credentials. Suppose that the last user of camera 106 is unauthorized entity 104 (e.g., scenario 120). Camera 106 may have a fingerprint reader or palm print reader that captures the biometric credentials of unauthorized entity 104. In response to determining that the fingerprints do not match the stored fingerprint of authorized entity 102, biometrics component 450 may conclude that the last user and the first operator are different people.

If it is determined that the retrieved biometric credentials between the last user and the first operator are different, method 600 advances to block 618. In some aspects, if it is determined that the biometric credentials match (e.g., same person used the security camera), method 600 advances to block 606. In other aspects, method 600 may advance to block 514 instead.

At block 606, the method 600 includes detecting an interruption in a connection between a computing device and the security camera. For example, in an aspect, computer device 400, processor 405, memory 410, CCC 415, and/or connections component 451 may be configured to or may comprise means for detecting an interruption in a connection between a computing device (e.g., a smartphone or smartwatch of authorized entity 102) and camera 106. Suppose that the two devices are paired using a Bluetooth connection. If one of the devices gets damaged or entities 102 and 104 enter an area with high interference or camera 106 becomes physically distant from the computing device of entity 102, the connection may be lost. This disconnection is a sign of uncertainty because anything may happen to camera 106 at that time.

At block 608, the method 600 includes determining whether the interruption lasted for more than a threshold period of time. For example, in an aspect, computer device 400, processor 405, memory 410, CCC 415, and/or connections component 451 may be configured to or may comprise means for determining whether the interruption lasted for more than 30 minutes.

If it is determined that interruption lasted for more than a threshold period of time, method 600 advances to block 618. A prolonged disconnection may suggest that custody of the camera 106 has been compromised. In some aspects, if it is determined that the interruption did not last for more than the threshold period of time, method 600 advances to block 610. In other aspects, method 600 may advance to block 514 instead.

At block 610, the method 600 includes retrieving a current location of a computing device and a current location of the security camera. For example, in an aspect, computer device 400, processor 405, memory 410, CCC 415, and/or locations component 452 may be configured to or may comprise means for retrieving a current location (e.g., GPS coordinates) of a computing device (e.g., a smartphone or smartwatch of authorized entity 102) and a current location of camera 106.

At block 612, the method 600 includes determining whether a distance between each location is greater than a threshold distance. For example, in an aspect, computer device 400, processor 405, memory 410, CCC 415, and/or locations component 452 may be configured to or may comprise means for determining whether a distance between each location is greater than 300 meters.

If it is determined that the distance is greater than the threshold distance, method 600 advances to block 618. In some aspects, locations component 452 may further determine whether the distance over the threshold distance was maintained for more than a threshold period of time. A prolonged time during which the camera 106 was far away from authorized entity 102 (assuming the smartphone and/or smartwatch have remained in the possession of entity 102) suggests that custody of the camera 106 has been compromised. In some aspects, if it is determined that the distance is not greater than the threshold distance, method 600 advances to block 614. In other aspects, method 600 may advance to block 514 instead.

At block 614, the method 600 includes determining whether an identifier of a creator of the video clip matches an identifier of the first operator. For example, in an aspect, computer device 400, processor 405, memory 410, CCC 415, and/or identifier component 453 may be configured to or may comprise means for an identifier of a creator of the video clip (e.g., biometric credentials or name or connected computing device) matches an identifier of the first operator.

If it is determined that the identifiers do not match, method 600 advances to block 616. In some aspects, if it is determined that the identifiers match, method 600 advances to block 516.

At block 616, the method 600 includes determining that the activity is inconsistent with the chain of custody. For example, in an aspect, computer device 400, processor 405, memory 410, CCC 415, and/or verifying component 440 may be configured to or may comprise means for determining that the activity is inconsistent with the chain of custody.

At block 618, the method 600 includes determining that the custody of the security camera by the first operator has been lost. For example, in an aspect, computer device 400, processor 405, memory 410, CCC 415, and/or verifying component 440 may be configured to or may comprise means for determining that the custody of camera 106 by authorized entity 102 has been lost.

It should be noted that each reference biometric credential or identifier of an authorized user/operator and each threshold distance of measure of time is stored in a database in memory 410. CCC 415 may retrieve this information to compare with newly acquired biometrics or distances and times from memory 410 of computing device 400 or any other computing device in network 206.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for tracking chain of custody of a security camera using blockchain, comprising:
    receiving and granting a request for custody of a security camera by a first operator;
    generating a block of a blockchain, wherein the block comprises an identifier of the first operator, an identifier of the security camera, and a request timestamp;
    distributing the blockchain to a plurality of nodes in a blockchain network;
    for each indication received of activity associated with usage and custody of the security camera to be recorded on the blockchain, verifying the activity and generating a new block on the blockchain recording the activity;
    receiving a video clip from the security camera;
    verifying an authenticity of the video clip based on each activity recorded in the blockchain; and
    in response to determining that the video clip is not authentic, generating an alert indicating inauthenticity.

2. The method of claim 1, wherein the activity comprises one of recording, viewing, sharing, modifying, or deleting an image and/or video.

3. The method of claim 1, wherein determining that the video clip is not authentic comprises detecting activity indicating that the custody of the security camera by the first operator has been lost.

4. The method of claim 3, wherein the request for custody includes biometric credentials of the first operator, and wherein the activity indicating that the custody of the security camera has been lost comprises detection of biometric credentials different from the biometric credentials of the first operator when the security camera is being used.

5. The method of claim 4, wherein the biometric credentials include a face identifier, an iris identifier, a palm identifier, a voice identifier, or a fingerprint identifier.

6. The method of claim 3, wherein the request for custody includes an identifier of a computing device that will be connected to the security camera, and wherein the activity indicating that the custody of the security camera has been lost includes one of:
    an interruption in a connection between the computing device and the security camera lasting for more than a threshold period of time, or
    a difference in locations of the computing device and the security camera that exceeds a threshold distance.

7. The method of claim 1, wherein determining that the video clip is not authentic comprises detecting an activity inconsistent with the chain of custody of the security camera.

8. The method of claim 7, wherein detecting the activity inconsistent with the chain of custody comprises:
    determining that an identifier of a creator of the video clip does not match the identifier of the first operator.

9. The method of claim 1, wherein multiple security cameras and activity associated with the multiple security cameras are stored on the blockchain.

10. The method of claim 1, wherein the blockchain is a part of a plurality of blockchains, wherein each respective blockchain holds records of a different security camera.

11. The method of claim 1, wherein the blockchain network is a private blockchain network.

12. The method of claim 1, wherein receiving and granting the request for custody of the security camera by the first operator comprises:
    verifying, using a smart contract, that the first operator can take custody of the security camera;
    issuing, using the smart contract, a non-fungible token (NFT) comprising the identifier of the security camera to the first operator, wherein possession of the NFT is indicative of custody and wherein the possession is monitored on the blockchain.

13. An apparatus for tracking chain of custody of a security camera using blockchain, comprising:
    a memory; and
    a processor communicatively coupled with the memory and configured to:
        receive and grant a request for custody of a security camera by a first operator;
        generate a block of a blockchain, wherein the block comprises an identifier of the first operator, an identifier of the security camera, and a request timestamp;
        distribute the blockchain to a plurality of nodes in a blockchain network;
        for each indication received of activity associated with usage and custody of the security camera to be recorded on the blockchain, verify the activity and generate a new block on the blockchain recording the activity;
        receive a video clip from the security camera;
        verify an authenticity of the video clip based on each activity recorded in the blockchain; and
        in response to determining that the video clip is not authentic, generate an alert indicating inauthenticity.

14. The apparatus of claim 13, wherein the activity comprises one of recording, viewing, sharing, modifying, or deleting an image and/or video.

15. The apparatus of claim 13, wherein determining that the video clip is not authentic comprises detecting activity indicating that the custody of the security camera by the first operator has been lost.

16. The apparatus of claim 15, wherein the request for custody includes biometric credentials of the first operator, and wherein the activity indicating that the custody of the security camera has been lost comprises detection of biometric credentials different from the biometric credentials of the first operator when the security camera is being used.

17. The apparatus of claim 16, wherein the biometric credentials include a face identifier, an iris identifier, a palm identifier, a voice identifier, or a fingerprint identifier.

18. The apparatus of claim 15, wherein the request for custody includes an identifier of a computing device that will be connected to the security camera, and wherein the activity indicating that the custody of the security camera has been lost includes one of:
    an interruption in a connection between the computing device and the security camera lasting for more than a threshold period of time, or
    a difference in locations of the computing device and the security camera that exceeds a threshold distance.

19. The apparatus of claim 13, wherein determining that the video clip is not authentic comprises detecting an activity inconsistent with the chain of custody of the security camera.

20. A computer-readable medium storing instructions, for tracking chain of custody of a security camera using blockchain, executable by a processor to:
    receive and grant a request for custody of a security camera by a first operator;
    generate a block of a blockchain, wherein the block comprises an identifier of the first operator, an identifier of the security camera, and a request timestamp;
    distribute the blockchain to a plurality of nodes in a blockchain network;
    for each indication received of activity associated with usage and custody of the security camera to be recorded on the blockchain, verify the activity and generating a new block on the blockchain recording the activity;
    receive a video clip from the security camera;
    verify an authenticity of the video clip based on each activity recorded in the blockchain; and
    in response to determining that the video clip is not authentic, generate an alert indicating inauthenticity.

* * * * *